Dec. 17, 1946.  G. W. MARTIN  2,412,738
TANK FLUSHING DEVICE
Filed Dec. 19, 1944

INVENTOR.
GEORGE W. MARTIN
BY
ATTORNEYS

Patented Dec. 17, 1946

2,412,738

UNITED STATES PATENT OFFICE 2,412,738

TANK FLUSHING DEVICE

George W. Martin, Oakland, Calif.

Application December 19, 1944, Serial No. 568,871

1 Claim. (Cl. 4—57)

The present invention relates to improvements in a tank flushing device, and it consists of the combinations, constructions and arrangements hereinafter described and claimed.

An object of my invention is to provide a tank flushing device which is simple in construction and in which a chain is movable over pulleys and is used for unseating the valve rather than the usual lever mechanism.

A further object of my invention is to provide a device of the type described in which the pulley that carries the chain from the valve stem is rotatably and slidably mounted upon a shaft which is carried by the sides of the tank. The pulley is made self-aligning with respect to the valve and the device will operate more efficiently because of this construction.

Still a further object of my invention is to provide a device of the type described in which the valve may be unseated more easily than is possible with present day equipment.

Other objects and advantages will appear in the following specification, and the novel features of the device will be particularly pointed out in the appended claim.

Figure 1:
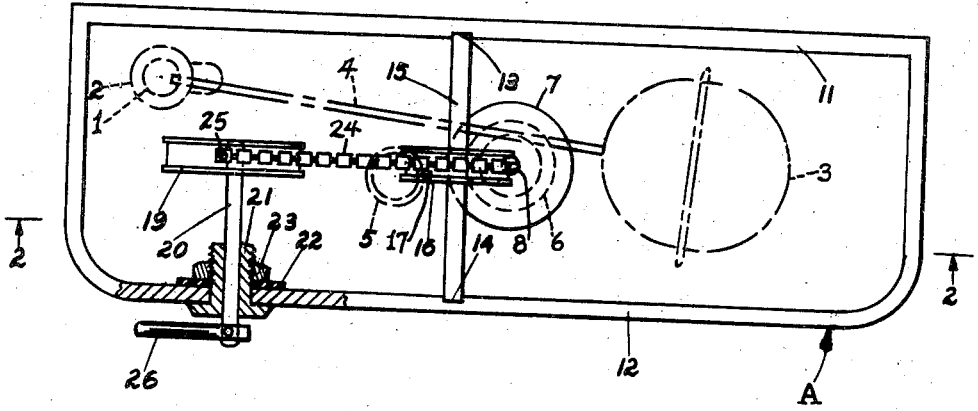
Figure 2:
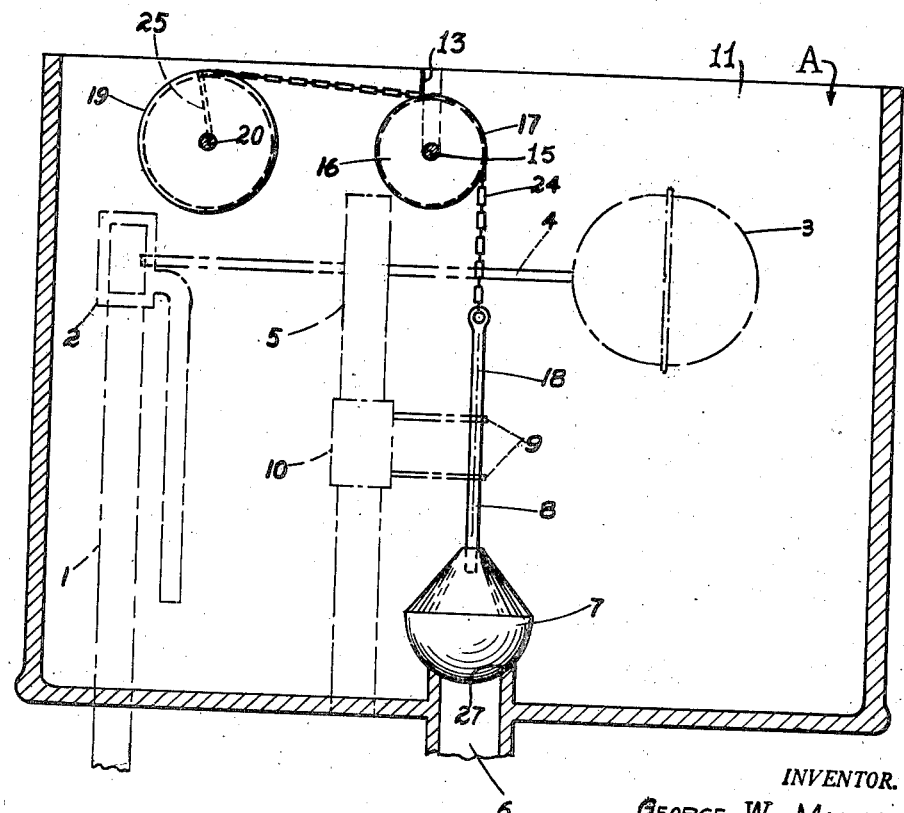

My invention is illustrated in the accompanying drawing forming a part of this application, in which:

Figure 1 is a top plan view of the device, shown operatively applied in a flush tank, portions being shown in section; and Figure 2 is a longitudinal section taken substantially along the line 2—2 of Figure 1.

While I have shown only the preferred form of my invention, it should be understood that various changes or modifications may be made within the scope of the appended claim without departing from the spirit and scope of the invention.

In carrying out my invention I make use of a flush tank indicated generally at A. The tank has the usual water inlet pipe 1 and float controlled valve 2. A float 3 is mounted on a valve arm 4 that in turn is operatively connected to the valve 2 for shutting off the flow of water into the tank when the float reaches a predetermined level.

An overflow pipe 5 carries any excess water to the toilet bowl, not shown. The tank has the usual outlet pipe 6 and a rubber valve 7 seats on the entrance end of the pipe 6 and is held in place by the pressure of water in the tank. A valve stem 8 projects upwardly from the valve 7 and is slidably received in arms 9 of a guide 10, the guide being secured to the overflow pipe 5. The parts thus far described form no part of my invention except insofar as they cooperate with the parts now to be described.

The rear and front walls 11 and 12 of the tank have parallel grooves 13 and 14 provided therein and a shaft 15 is placed in the tank so that its ends are received in the grooves and rest against the bottom of the grooves. An idler pulley 16 is rotatable and slidably mounted on the shaft 15 and the periphery 17 of the idler pulley is tangent with the axis line 18 of the stem 8.

An actuating pulley 19 is mounted on a shaft 20 and this shaft is rotatably received in a bushing 21 that extends through the tank wall 12. A gasket 22 is mounted on the bushing and the bushing is exteriorly threaded for receiving a nut 23 that secures the bushing to the wall.

A chain 24 is connected to the stem 8 of the valve 7 and the chain is passed over the idler pulley 16 and is secured to the pulley 19 by a screw 25. The screw 25 is long enough to extend down into the shaft 20 for keying the pulley to the shaft. An actuating handle 26 is secured to the shaft 20 for manipulating the apparatus.

From the foregoing description of the various parts of the device, the operation thereof may be readily understood.

When flushing the toilet, the handle 26 is depressed so that the pulley 19 will be rocked in a counterclockwise direction when looking at Figure 2. This movement will move the chain 24 over the idler pulley 16 and will lift the valve 7 from the valve seat 27. The water in the tank will now flow out through the outlet 6 for flushing purposes. The guide arms 9 will hold the stem 8 in a vertical position and the valve 7 will now float on the water. As the water level in the tank lowers, a suction will be created in the top of the outlet pipe 6 that will draw the valve body 7 down upon the valve seat 27.

As the valve body 7 moves back into its seating position, it will pull downwardly on the chain 24 and will rotate the pulley 19 in a clockwise direction for swinging the handle 26 back into starting position. As soon as the tank is filled with water, the float 3 will close the valve 2 and the device is now ready for further operation.

I claim:

The combination with a flushing tank having front and rear walls, an outlet pipe having a valve seat for the entrance end thereof, a rubber valve for closing the pipe when resting on the valve seat, a valve stem extending upwardly from the valve, and means for slidably holding the stem in a vertical position, of a horizontal shaft, the inner surfaces of the front and rear tank walls having opposed grooves facing each other and adapted to slidably receive the ends of the shaft, both grooves terminating the same distance below the tank top, the inner groove ends constituting supporting shoulders for the shaft ends, an idler pulley rotatably and slidably mounted on the shaft, the periphery of the pulley lying tangent to a line that coincides with the stem axis, a chain connected to the free end of the stem and extending over the idler pulley periphery, a manually rotatable pulley mounted in the tank and above the highest water line, the free end of the chain being connected to the last-named pulley, a shaft for the last-named pulley projecting through the front tank wall, and a handle for rocking the last-named shaft and pulley, whereby a rocking of the handle will cause the chain to unseat the valve, a reseating of the valve caused by the water suction in the outlet pipe, pulling on the chain and second-named pulley for returning the handle to starting position.

GEORGE W. MARTIN.